(No Model.)
J. W. CLOUD.
CAR BRAKE.
No. 245,789. Patented Aug. 16, 1881.
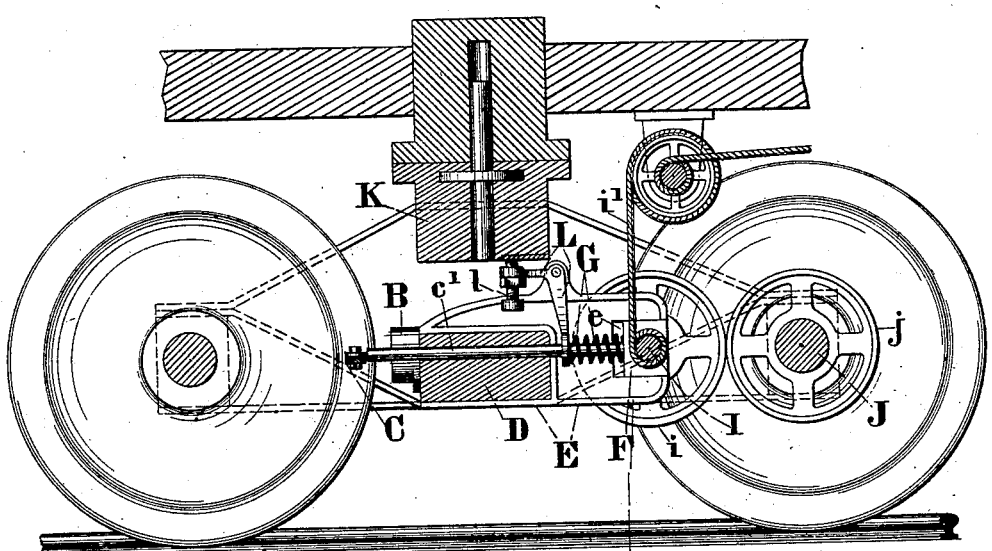
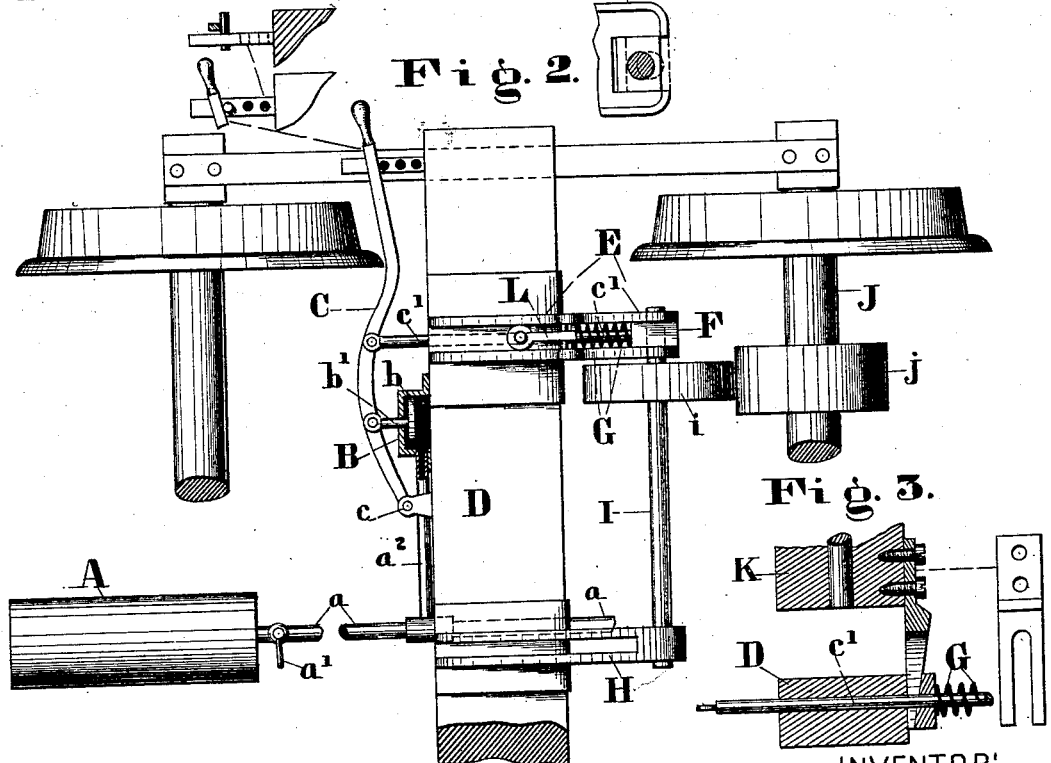
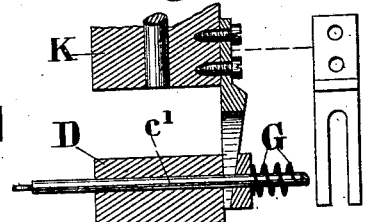
WITNESSES:
R. E. Janney
A. L. West
INVENTOR:
JOHN W. CLOUD,
BY H. W. Beadle & Co.
ATTYS.

UNITED STATES PATENT OFFICE.

JOHN W. CLOUD, OF ALTOONA, PENNSYLVANIA.

CAR-BRAKE.

SPECIFICATION forming part of Letters Patent No. 245,789, dated August 16, 1881.

Application filed May 19, 1881. (No model.)

*To all whom it may concern:*

Be it known that I, JOHN W. CLOUD, of Altoona, county of Blair, and State of Pennsylvania, have invented new and useful Improvements in Car-Brakes; and I do hereby declare that the following is a full and exact description of the same, reference being had to the accompanying drawings, and to the letters of reference marked thereon.

This invention consists mainly, first, in the combination, with any proper mechanism for applying brake-pressure to the wheels, of certain auxiliary mechanism for increasing or decreasing automatically the amount of pressure so applied in proportion to the increase or decrease in the load of the car; second, in the combination, with an actuating part upon the car-body, having a vertical movement directly proportioned to the load, and a base part upon the truck or running-gear having no such movement, of an interposed mechanism supported by the base part and actuated by the moving part, which is adapted to increase or decrease the amount of brake-pressure in proportion to the increase or decrease in the weight of the load; and, third, in the combination, with a spring of proper construction, adapted to actuate a proper brake device, of a base for said spring, connected directly or indirectly to a part of the car-body above the carrying-springs, which has a vertical movement proportioned to the variation in the weight of the load.

To enable others skilled in the art to understand my invention and properly use the same, I will now proceed to describe the construction and operation of the same.

The following general statement will make more clear, it is believed, the succeeding description.

The carrying-springs of a car are compressed to a greater or less extent, according to the combined weight of the car-body and its lading. Any part, then, of the car-body or truck which has a movement coinciding with the compression and extension of the carrying-springs is adapted to communicate a vertical movement directly proportioned to the variation in the weight of the load. Certain portions of the truck and running-gear—viz., those below the carrying-springs—have no proper vertical movement by increase or decrease in weight of lading. It appears, then, that in every car there is one point, which, for convenience, may be termed the "actuating-point," which has a vertical movement directly proportioned to the load, and another point, which, for convenience, may be termed the "base-point," which has no similar movement. Now, by the interposition between these two points of proper mechanism, the movement of the actuating-point, which is directly proportioned to the load, may be utilized to control the brake-pressure attainable. This interposed mechanism is auxiliary to the brake mechanism proper, and serves to modify the action of the latter by increasing or diminishing the amount of brake-pressure in proportion to the variations in the weight of the load. This interposed mechanism, which is employed in connection with the actuating part and the base-point, may be greatly varied.

The special construction in which my invention has been embodied will now be described.

A, Fig. 2, represents the ordinary air reservoir, located on the engine; $a$, the train-pipe, and $a'$ the operating-valve, constructed so as to admit the air from the reservoir to the train-pipe, or to permit the air to escape from the train-pipe into the atmosphere, according to the necessities of the case.

$a^2$ represents a branch pipe upon each individual car, which leads from the train-pipe $a$ to the cylinder B, located upon the spring-plank D, as shown.

$b$ represents a piston-head within the cylinder, which is united by means of the rod $b'$ to the lever C.

$c$ represents the standard of the lever C, which is supported by the spring-plank D; and $c'$, a rod united at one end to the lever and at the other to the journal-box F, as shown.

D, Figs. 1, 2, and 3, represents the spring-plank, before referred to, of a "diamond truck," which forms a base or support for the cylinder B, the standard $c$ of the lever C, and the intermediate mechanism employed to transmit the movement of the actuating-point as brake-pressure to the car-wheel. This plank is below the carrying-springs of the car, and it has no vertical movement from the varying weight of load.

E, Figs. 1 and 2, represents a bracket-casting, having at one end a recess adapted in form and size to inclose the spring-plank, as shown, and at the other a bearing-recess, $e$, Fig. 1, as shown.

F represents a journal-box adapted to rest in the recess $e'$ and to move therein a short distance, as indicated in dotted lines.

G, Figs. 1, 2, and 3, represents a spring located upon the rod $c'$, which bears at one end against the adjacent face of the journal-box F and at the other against the end of the lower arm of the lever L, hereinafter referred to.

H, Fig. 2, also represents a bracket of any proper construction extending from the spring-plank, which is provided at its end with a journal-bearing, as shown.

I, Figs. 1 and 2, represents a shaft supported in the bearings of the brackets E and H, which is provided with the pulley $i$ and with the rope or chain $i'$, one end of which is rigidly secured to the shaft and the other end directly or indirectly to the central brake-lever or other proper mechanism for applying the brake.

J, Figs. 1 and 2, represents a car-axle, and $j$ a pulley rigidly secured thereto in any proper manner.

K represents the bolster, resting upon the carrying-springs, which has, consequently, a vertical movement equal to the compression or extension of the springs.

L, Figs. 1 and 2, represents a bell-crank lever, pivoted in a proper standard rising from the spring-plank, the end of one arm of which bears against the bottom of the bolster and the end of the other arm against one end of the spring G upon the rod $c'$, as shown.

$l$ represents a screw, by means of which the proper adjustment is made, when the car is empty, to cause the spring G, when free to act, to move the friction-pulley I into contact with the pulley J on the car-axle.

The operation is substantially as follows: The screw $l$ of lever L having been properly adjusted, it follows that, even when the car is empty, the friction-pulley I, by the action of the lever L and the spring G, will be held, when the latter is free to act, in contact with the pulley J on the car-axle. By means of this contact the brake-pulley I, when the cars are in motion, is caused to revolve and apply the brakes by means of the rope $i$, as shown.

When the car is empty the spring G, not being much compressed, exerts simply what may be termed, for convenience, its "normal" pressure upon the friction-pulley I—that is, the pressure which it is adapted to give by the position of the adjusting-screw. When, however, the car is loaded, the spring G, being necessarily more compressed, exerts consequently an increased pressure upon the friction-pulley, the amount of increase being directly proportioned to the weight of the load. The greater the pressure exerted upon the friction-pulley the greater will be the power communicated to it by the pulley upon the revolving axle, and consequently, also, the greater will be the power applied to the brakes. The brakes are applied, it will be understood, by permitting the spring G to exert its power to move the friction-pulley I into contact with the pulley J. The brakes are released by overcoming the power of this spring and withdrawing the friction-pulley from contact with the pulley upon the revolving axle.

The mechanism for controlling the action of the spring operates substantially as follows: When it is desired to overcome the action of the spring G for the purpose of releasing the brakes, the operating-valve $a'$ is properly actuated to admit air from the reservoir A through the train-pipe $a$ and branch pipe $a^2$ to the cylinder B. The pressure upon the piston-head being greater than the power exerted by the spring G when compressed to its maximum extent, it follows that the piston-head will move outward and draw the rod $c'$ with it against the resistance of the spring G. By the movement of the rod $c'$ the friction-pulley is withdrawn from contact with the pulley upon the car-axle, and being out of contact it has, of course, no movement.

By maintaining the necessary pressure in the cylinder the spring G may be held out of action any desired length of time.

When it is desired to apply the brakes the valve $a'$ is properly actuated to permit the escape of air from the train-pipe and cylinder, and consequently, the spring G being released, the friction-pulley is moved again into contact to apply the brakes in the manner before described.

The spring may be held out of action, when desired, by securing the end of lever C in the proper position in the standard by the pin $c^2$, as shown. The length of the lever is sufficient to enable a person to move the same into this position against the resistance of the spring G, if it is necessary to do so; but by inserting the pin into position before the pressure is withdrawn from the cylinder this necessity will not arise.

It is essential, of course, that when individual cars are moved about the yard, in switching, &c., the brakes should be held out of action.

After the cars are coupled in making up a train the strain upon the pins may be removed by simply applying the air-pressure, when, of course, they may be taken out without difficulty.

When a car, in starting out, moves in an opposite direction from that in which it has been moving, the brake-chain, on the first application of the brakes, will first unwind and then wind in the opposite direction.

In case a train breaks in two, or an individual car becomes separated therefrom, the brakes will be instantly applied.

The value of this invention may be better appreciated when it is understood that freight-cars, to which it is principally applied, carry loads which vary greatly in weight, the weight per wheel at one time being even three times as great as it is at another. It frequently happens, also, that empty cars, cars with a partial load, and heavily-laden cars are hauled in one and the same train. If the braking-power under these circumstances is uniform, one of two evils will result—either the wheels under the lighter cars will be made to slide, or the heavier cars will not receive the braking action they should receive in order to stop the train in the least possible distance.

When it is considered that it is of great importance to stop the train in the least possible distance consistent with safety, and that the sliding of a wheel destroys the same, the great defect of the present system will be appreciated.

A perfect system of braking must be able to cause automatically the application of a brake-pressure to each wheel which shall be so proportioned to the pressure of that wheel upon the rail as to offer the greatest resistance to its revolution that is possible without stopping the same. The amount of pressure of the wheel upon the rail is determined by the weight of the car and its load and the variation from the normal pressure—that is, the pressure exerted by an empty car is determined by the load in the car. A system, then, which, after adjustment for the normal pressure has been made, will automatically increase the pressure in proportion to the increase in the load, overcomes the defects incidental to the ordinary system. Such a system as this is that one which has been hereinbefore described. By means of it every ton of weight carried by the car-springs is utilized to do an equal amount of braking, regardless of the distribution of the total weight of the train among the individual cars, the automatism of such action being complete without the setting of valves, levers, or other devices.

I do not limit myself to the precise construction shown.

If desired, other proper intermediate mechanism may be employed to transmit the movement of the actuating-point in the form of brake-pressure to the wheel.

If desired, the bell-crank lever I may be replaced by a wedge, as shown in Fig. 3.

If desired, gearing or other proper mechanism may be employed to communicate the movement of the brake-shaft to the brake-lever.

If desired, a diaphragm may be used in the cylinder in place of the piston-head.

If desired, friction-cones may be employed in place of the pulleys.

Having fully described my invention, what I claim as new, and desire to secure by Letters Patent, is—

1. In combination with any proper mechanism for applying brake-pressure to the wheels, auxiliary mechanism, substantially as described, for increasing or decreasing the amount of pressure so applied in proportion to the increase or decrease in the load of the car.

2. In combination with a spring of proper construction adapted to actuate a proper brake device, a base for said spring moved by a part of the car-body above the carrying-springs, which has a vertical movement proportioned to the variations in the weight of the load.

3. In combination with the spring G, friction-pulley i, and the pulley j, the auxiliary mechanisms K L, for increasing or decreasing the pressure of the friction-pulley in proportion to the increase or decrease in the weight of the load.

4. In combination with the bolster K, having a vertical movement directly proportioned to the load, and the spring-plank D, having no such movement, the interposed mechanism L, adapted to increase or decrease the amount of brake-pressure in proportion to the increase or decrease in the weight of the load.

5. In combination with the spring G, adapted to actuate the friction pulley i, the base L, connected to and receiving movement from a part of the car-body having a vertical movement proportioned to the variations in the load.

6. In combination with a spring, substantially as described, adapted to actuate proper brake devices, a movable base for determining the amount of pressure exerted by the spring, and means, substantially as described, for holding the spring out of action.

7. In combination with a spring, substantially as described, adapted to actuate proper brake devices, a movable base for the spring, and means, substantially as described, for actuating the base to increase or decrease the pressure exerted by the spring.

This specification signed and witnessed this 10th day of May, 1881.

JNO. W. CLOUD.

Witnesses:
A. O. DAYTON,
C. H. KENNEY.